UNITED STATES PATENT OFFICE 2,175,816

PREPARATION OF CARBON SULPHOSELENIDES

Winfield Scott, Akron, Ohio, assignor to Wingfoot Corporation, Wilmington, Del., a corporation of Delaware No Drawing. Application June 24, 1938, Serial No. 215,629

10 Claims. (Cl. 23—14)

This invention relates to an improved method of preparing carbon sulphoselenide in greater yields and more economically than has heretofore been possible.

Carbon sulphoselenide, CSSe, finds use as an intermediate for the preparation of selenium-containing compounds, such as analogs of dithiocarbamates and other sulphur compounds. No practicable method for the preparation of this intermediate has previously been known, only negligible yields being obtained by such methods as passing carbon disulphide over ferrous selenide and striking an arc under carbon bisulphide with carbon electrodes containing selenium.

The present method of preparation is based upon the reaction of mustard oils and hydrogen sulphide. If phenyl mustard oil is reacted with H₂S at room temperature, there will be formed thiocarbanilid and carbon bisulphide. By replacing the hydrogen sulphide with hydrogen selenide the carbon sulphoselenide is obtained instead, in accordance with the following equation:

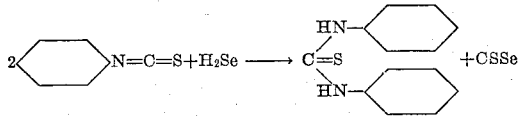

The mechanism of the reaction may be represented as the addition of hydrogen selenide to phenyl mustard oil to form phenyl seleno thiocarbamic acid and the decomposition of this into aniline and carbon sulphoselenide, thus;

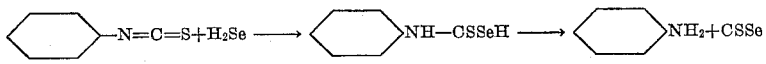

As the aniline is formed, it reacts immediately with excess phenyl mustard oil present to give thiocarbanilid

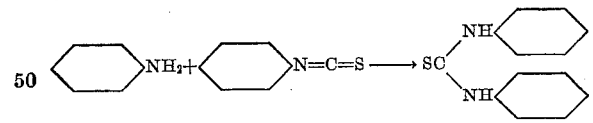

However, this thio carbanilid is recovered after the carbon sulphoselenide has been distilled off and is converted again into the starting material, phenyl mustard oil, by the action of a mineral acid, such as phosphoric, sulphuric or hydrochloric

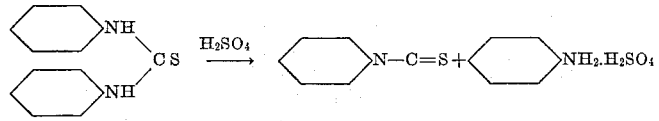

To illustrate one method of carrying out the invention, the following example is given, but it will be understood that the invention is not limited thereto.

Example

One part of phenyl mustard oil (phenyl isothiocyanate) is mixed with 2 to 4 parts of toluene and hydrogen selenide is passed into the mixture at room temperature until no more of the gas is absorbed. When absorption has ceased, the mixture is distilled and the carbon sulphoselenide is taken off in the distillate in the range between 75° and 100° C. If desired, this fraction may be redistilled and carbon sulphoselenide of very high purity obtained.

The method illustrated in the foregoing example may be modified in various respects within the scope of the invention, as by replacing the phenyl mustard oil with other mustard oils, especially the aryl isothiocyanates, such as tolyl isothiocyanate, xylyl isothiocyanate, naphthyl isothiocyanate, alpha naphthyl isothiocyanate, beta naphthyl isothiocyanate, and aryl isothiocyanates in which the aryl group has been further substituted as by halogen, such as chlorophenyl isothiocyanate, etc. The solvent used may also be varied, it being preferred to use one which has a boiling point above 100° C. in order to facilitate separation of the product, carbon sulphoselenide. Among these may be mentioned toluene, xylene and high boiling naphtha. The temperature employed for the reaction is usually about room temperature but this may be varied without affecting the result other than with respect to the efficiency of the reaction. Also, the quantities of reactants will approach molecular or equivalent proportions but an excess of one or the other may sometimes be present.

The method can also be varied by starting with thiocarbanilid or other diaryl or mono aryl thiourea. Thus, thiocarbanilid plus a non-oxidizing mineral acid, such as dilute sulphuric acid, yields phenyl mustard oil and aniline sulphate and the process can then continue from this point the same as if phenyl mustard oil had been used as a starting material. The mustard oil may be separated from the aniline sulphate, if desired, before the hydrogen selenide is passed in, the separation being effected by decantation or steam distillation. The preliminary reaction proceeds as follows:

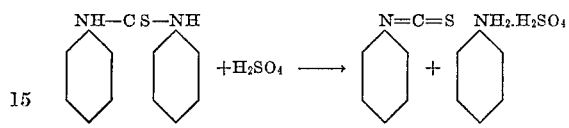

Or, the process can be conducted without separation, as by treating the diaryl or mono aryl thiourea with the dilute non-oxidizing mineral acid under refluxing conditions until the reaction has been completed. Thereupon, the hydrogen selenide gas is passed into the mixture of mustard oil and amine salt and the carbon sulphoselenide is then distilled off. In addition to the thiocarbanilid or diphenyl thiourea above mentioned, there may be used in the foregoing modifications of the process ditolyl thiourea, dixylyl thiourea, dinaphthyl thiourea, mono phenyl thiourea, mono tolyl thiourea, and other diaryl and mono aryl thioureas. Any thiocarbanilid or analog remaining when the process has gone to completion may be recovered and treated with additional acid and additional hydrogen selenide to produce more carbon sulphoselenide.

By still another method carbon sulphoselenide may be produced directly from a mono or diaryl thiourea such as one of those mentioned above, by passing the hydrogen selenide gas into the aryl thiourea in molten condition, e. g., into molten thiocarbanilid, and the carbon sulphoselenide recovered therefrom, the product preferably being removed as formed.

There is thus provided a method of preparing carbon sulphoselenide by starting with either an aryl isothiocyanate or an aryl thiourea and introducing selenium by means of hydrogen selenide. The process accordingly comprises treating with hydrogen selenide gas, either directly or after preliminary reaction, a compound of the general formula $(R)_xCS$, in which R is an aryl—NH— or an aryl—N= radical and $x$ is one or two.

The herein described process results in a greatly improved yield of carbon sulphoselenide and makes this intermediate more available for reactions with amines and the like to form seleno thiocarbamates and other compounds in which a selenium atom replaces a sulphur atom in the numerous thio and sulpho compounds known to organic chemistry.

Although only the preferred embodiment of the invention has been described in detail, it will be apparent to those skilled in the art that various modifications may be made therein without departing from the spirit of the invention or the scope of the appended claims in which it is intended to include all features of patentable novelty residing in the invention.

What I claim is:

1. A method of preparing carbon sulphoselenide which comprises reacting hydrogen selenide with a compound from the group consisting of the aryl isothiocyanates and the aryl thioureas and recovering carbon sulphoselenide.

2. A method of preparing carbon sulphoselenide which comprises reacting hydrogen selenide with a mustard oil and recovering carbon sulphoselenide.

3. A method of preparing carbon sulphoselenide which comprises reacting hydrogen selenide with an aryl isothiocyanate and recovering carbon sulphoselenide.

4. A method of preparing carbon sulphoselenide which comprises reacting hydrogen selenide with phenyl isothiocyanate and recovering carbon sulphoselenide.

5. A method of preparing carbon sulphoselenide which comprises dissolving a mustard oil in a solvent, passing hydrogen selenide gas thereinto until no more is absorbed and distilling off carbon sulphoselenide.

6. A method of preparing carbon sulphoselenide which comprises dissolving phenyl mustard oil in toluene, passing hydrogen selenide gas thereinto until no more is absorbed and distilling the reaction mixture between 75° and 100° C. to obtain carbon sulphoselenide.

7. A method of preparing carbon sulphoselenide which comprises dissolving an aryl isothiocyanate in a solvent having a boiling point higher than carbon sulphoselenide, passing hydrogen selenide gas thereinto until no more is absorbed and distilling off carbon sulphoselenide.

8. A method of preparing carbon sulphoselenide which comprises adding an aryl thiourea and a non-oxidizing mineral acid to an inert solvent for the former, passing hydrogen selenide gas thereinto and recovering carbon sulphoselenide therefrom.

9. A method of preparing carbon sulphoselenide which comprises adding thiocarbanilid and a mineral acid to an inert solvent for phenyl mustard oil, passing hydrogen selenide gas thereinto and recovering carbon sulphoselenide therefrom.

10. A method of preparing carbon sulphoselenide which comprises adding a diaryl thiourea and a mineral acid to an inert solvent for the former, passing hydrogen selenide gas thereinto and recovering carbon sulphoselenide therefrom.

WINFIELD SCOTT.